(12) United States Patent
Mitomo

(10) Patent No.: US 10,979,983 B2
(45) Date of Patent: Apr. 13, 2021

(54) POWER SUPPLY DEVICE, MONITORING METHOD, COMPUTER PROGRAM PRODUCT, AND COMMUNICATION SYSTEM

(71) Applicant: KABUSHIKI KAISHA TOSHIBA, Minato-ku (JP)

(72) Inventor: Toshiya Mitomo, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/291,149

(22) Filed: Mar. 4, 2019

(65) Prior Publication Data
US 2019/0394661 A1    Dec. 26, 2019

(30) Foreign Application Priority Data

Jun. 21, 2018    (JP) .............................. JP2018-118252

(51) Int. Cl.
| | |
|---|---|
| *H04W 52/24* | (2009.01) |
| *H02J 50/40* | (2016.01) |
| *H02J 50/20* | (2016.01) |
| *H04W 24/10* | (2009.01) |
| *G08B 21/18* | (2006.01) |
| *G08B 5/22* | (2006.01) |
| *H04L 12/24* | (2006.01) |

(52) U.S. Cl.
CPC .......... *H04W 52/243* (2013.01); *H02J 50/20* (2016.02); *H02J 50/40* (2016.02); *H04W 52/24* (2013.01); *G08B 5/22* (2013.01); *G08B 21/182* (2013.01); *H04L 41/0681* (2013.01); *H04W 24/10* (2013.01)

(58) Field of Classification Search
CPC ... G01S 1/02; G01S 1/026; G01S 1/04; G01S 1/045; G01S 1/047; H04W 52/24; H04W 52/241; H04W 52/242; H04W 52/243; H04W 52/245; H04W 52/246; H04W 52/248; H04W 52/367; H04B 7/02; H04B 7/0404; H04B 7/0619; H04B 7/0623; H04B 7/0626; H04B 7/24; H04B 7/26
See application file for complete search history.

(56) References Cited

U.S. PATENT DOCUMENTS

| | | | |
|---|---|---|---|
| 2012/0153894 A1 | 6/2012 | Widmer | |
| 2014/0103708 A1 | 4/2014 | Kanahara et al. | |
| 2015/0004975 A1* | 1/2015 | Yamamoto | H04W 36/30 455/436 |
| 2015/0091506 A1* | 4/2015 | Hyde | B60L 11/182 320/108 |
| 2016/0241086 A1* | 8/2016 | Jung | H02J 50/80 |

(Continued)

FOREIGN PATENT DOCUMENTS

| | | |
|---|---|---|
| JP | 5698723 | 4/2015 |
| JP | 5739011 | 6/2015 |

*Primary Examiner* — Van T Trieu
(74) *Attorney, Agent, or Firm* — Oblon, McClelland, Maier & Neustadt, L.L.P.

(57) ABSTRACT

According to one embodiment, a power supply device includes one or more processors. The one or more processors control wireless power supply by an electromagnetic wave to a power receiving device. The one or more processors monitor a radio wave state of a wireless signal received by an antenna. The one or more processors output output information based on a monitoring result.

18 Claims, 9 Drawing Sheets

(56) References Cited

U.S. PATENT DOCUMENTS

2017/0331329 A1\* 11/2017 Kim ........................ H02J 50/80
2018/0294681 A1\* 10/2018 Bae ........................ H02J 50/80
2019/0181697 A1\*  6/2019 Malkin ................... H02J 50/80
2019/0364492 A1\* 11/2019 Azizi .................. H04W 68/005

\* cited by examiner

Y

POWER SUPPLY DEVICE, MONITORING METHOD, COMPUTER PROGRAM PRODUCT, AND COMMUNICATION SYSTEM

CROSS-REFERENCE TO RELATED APPLICATIONS

This application is based upon and claims the benefit of priority from Japanese Patent Application No. 2018-118252, filed on Jun. 21, 2018; the entire contents of which are incorporated herein by reference.

FIELD

Embodiments described herein relate generally to a power supply device, a monitoring method, a computer program product, and a communication system.

BACKGROUND

A device that controls a power supply frequency or the like in accordance with a state of power supply to a plurality of power receiving targets such that interference to the power reception targets is reduced has been proposed as a power supply device for a remote power receiving target using a microwave or the like. Further, a power supply device that detects that an external wireless device is performing radio wave search and stops power supply has been proposed.

However, the techniques of the related art do not deal with existing wireless communication systems that use a band (for example, ±10% of a transmission signal frequency) near a frequency band of a transmission signal performing power transmission. For this reason, there are cases in which strong interference to a wireless communication system is caused by transmission of an electromagnetic wave for power transmission.

DETAILED DESCRIPTION

According to one embodiment, a power supply device includes one or more processors. The one or more processors control wireless power supply by an electromagnetic wave to a power receiving device. The one or more processors monitor a radio wave state of a wireless signal received by an antenna. The one or more processors output output information based on a monitoring result.

Hereinafter, exemplary embodiments of a power supply device according to the invention will be described in detail below with reference to the appended drawings.

For example, as a solution to the above problem, it is effective to constitute the power supply device to monitor a frequency use state of a wireless communication system, select a frequency band, a timing, and a position at which it is less susceptible to interference, and transmit a power transmission signal. Here, in this method, the communication state (frequency use state) of the wireless communication system does not change. Therefore, a degradation risk of the communication state is reduced, but the communication state is unlikely to be improved. As a result, the quality of communication is likely to deteriorate due to an increase in the number of users of the wireless communication system or the like.

In this regard, in each of the following embodiments, for example, a monitoring result of monitoring a radio wave state of a wireless signal is output to a wireless communication system. Accordingly, it is possible not only to reduce the quality degradation risk of the wireless communication system caused by the power supply signal but also to improve the quality of the wireless communication system.

First Embodiment

Figure 1:
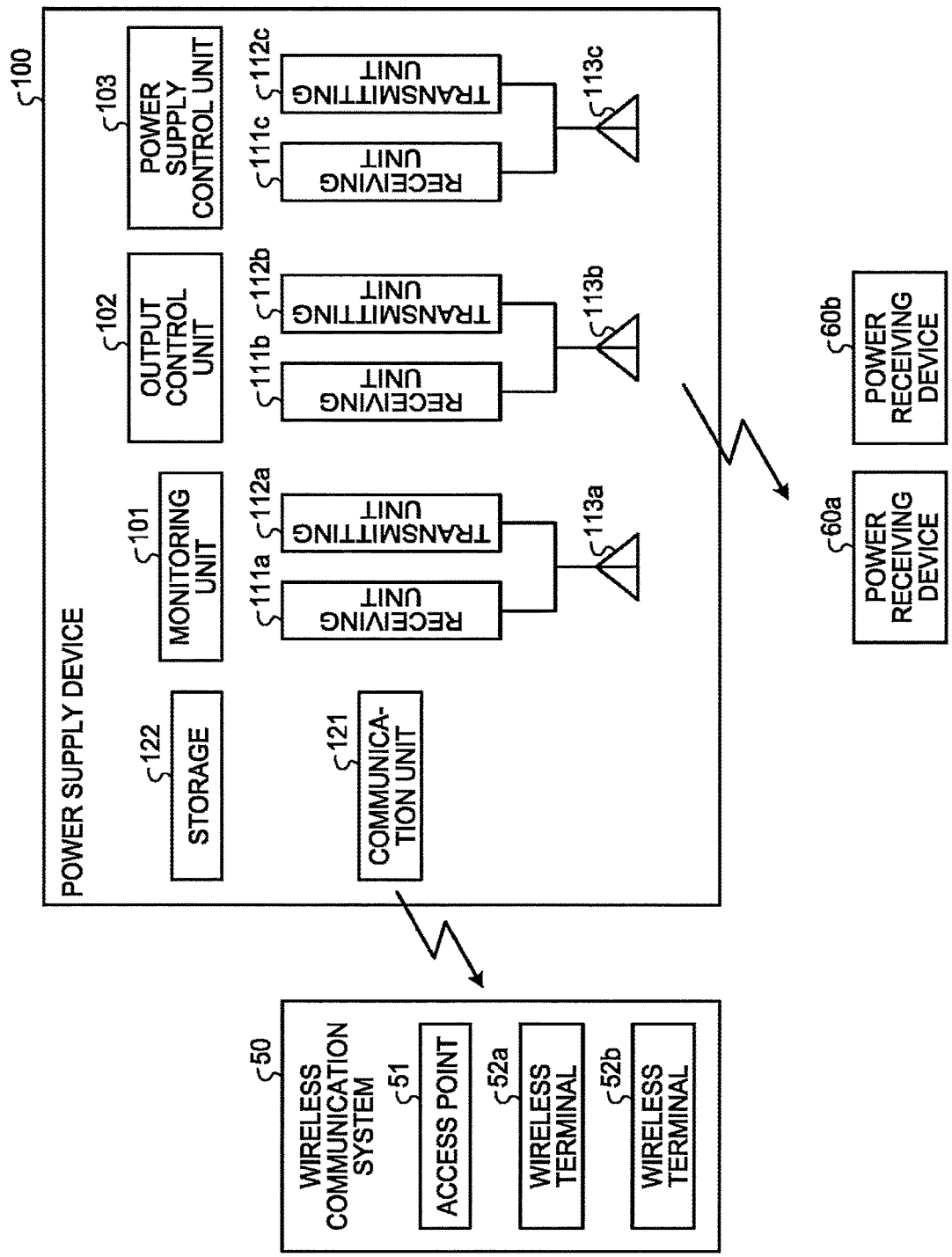
FIG. 1 is a block diagram of a communication system according to a first embodiment.

FIG. 1 is a block diagram illustrating an example of a configuration of a communication system including a power supply device 100 according to the first embodiment. As illustrated in FIG. 1, the communication system includes a wireless communication system 50, power receiving devices 60a and 60b, and a power supply device 100.

The power receiving devices 60a and 60b are devices serving as power supply targets by the power supply device 100. In a case in which it is not necessary to distinguish the power receiving devices 60a and 60b, they are referred to simply as a power receiving device 60. A single power receiving device 60 may be provided, or three or more power receiving devices 60 may be provided. The power receiving device 60 is, for example, a device that supplies electric power to a wireless Internet of things (IoT) sensor used in a factory or the like.

The wireless communication system 50 is a communication system that performs wireless communication, and includes an access point 51 and wireless terminals 52a and 52b. Two or more access points 51 may be provided. In a case in which it is not necessary to distinguish the wireless terminals 52a and 52b, they are simply referred to as a wireless terminal 52. A single wireless terminal 52 may be provided, or three or more wireless terminals 52 may be provided. Although only one wireless communication system 50 is illustrated in FIG. 1, a communication system may include a plurality of wireless communication systems.

The wireless communication used by the wireless communication system 50 may be communication conforming to any standard such as, for example, a wireless LAN conforming to IEEE 802.11.

The wireless communication system 50 may include a communication device in addition to the access point 51 and the wireless terminal 52. For example, the wireless communication system 50 may include an information processing device for setting the access point 51 and an information processing device to be used by an administrator of the wireless communication system 50.

For example, the wireless communication system 50 may perform wireless communication in or near an area in which the power supply device 100 is installed (such as a building, an office, or a factory). The wireless communication system 50 performs wireless communication using a frequency that is likely to suffer from interference from a frequency of an electromagnetic wave used for power supply by the power supply device 100 (for example, a frequency of a band of ±10% of the frequency of the electromagnetic wave used for power supply). In other words, the wireless communication by the wireless communication system 50 is performed within an area that is likely to be affected by electromagnetic waves transmitted for power supply by the power supply device 100.

The power supply device 100 includes a communication unit 121, storage 122, receiving units 111a to 111c, transmitting units 112a to 112c, antennas 113a to 113c, a monitoring unit 101, an output control unit 102, and a power supply control unit 103.

The communication unit 121 performs communication with an external device such as the wireless communication system 50 or an external system. For example, when the communication unit 121 performs communication with the access point 51 and the wireless terminal 52, the communication unit 121 performs wireless communication in accordance with a standard used by the wireless communication system 50. The communication unit 121 may perform communication with the wireless communication system 50 via wireless communication other than a standard usually used by the access point 51 or the like and wired communication. The communication unit 121 may perform wireless communication or wired communication with a device or system other than the wireless communication system 50.

The storage 122 stores various types of data used in various types of processes performed by the power supply device 100. The storage 122 can be constituted by a commonly used storage medium such as a flash memory, a memory card, a random access memory (RAM), a hard disk drive (HDD), or an optical disk.

The antennas 113a to 113c are antennas used for transmission of an electromagnetic wave for supplying power to the power receiving device 60 and reception of a wireless signal for monitoring a radio wave state. The antennas 113a to 113c may be divided into an antenna for transmitting an electromagnetic wave for supplying power to the power receiving device 60 and an antenna for receiving a wireless signal for monitoring the radio wave state. For example, the antennas 113a to 113c may be configured as an array antenna in which they are arranged in an array form. By using the array antenna, for example, an arriving direction of the wireless signal can be detected. In a case in which it is not necessary to distinguish the antennas 113a to 113c, they are referred to simply as an antenna 113. The number of antennas 113 is not limited to three but may be one, two, or four or more.

The receiving units 111a to 111c are connected to the antennas 113a to 113c, respectively. In a case in which it is not necessary to distinguish the receiving units 111a to 111c, they are referred to simply as a receiving unit 111. The receiving unit 111 performs power detection, demodulation, or the like on a signal received by the antenna 113 connected thereto, and outputs a received wireless signal, for example, to the monitoring unit 101.

The transmitting units 112a to 112c are connected to the antennas 113a to 113c, respectively. In a case in which it is not necessary to distinguish the transmitting units 112a to 112c, they are referred to simply as a transmitting unit 112. The transmitting unit 112 performs modulation or the like on a signal for power supply, and transmits the modulated power transmission signal from the antenna 113 connected thereto. The transmitting unit 112 may transmit a non-modulated power transmission signal such as an unmodulated sine wave and a continuous wave. In a configuration in which the power supply antenna and the monitoring antenna are divided, the transmitting unit 112 corresponding to the power supply antenna 113 transmits an electromagnetic wave for power supply.

The monitoring unit 101 monitors the radio wave state of the wireless signal received by the antenna 113. Examples of the radio wave state include a temporal change of a frequency of the wireless signal, a temporal change of a strength of the wireless signal, and an arriving direction of the wireless signal. In the case of the configuration in which the power supply antenna and the monitoring antenna are divided, the monitoring unit 101 monitors the radio wave state of the wireless signal using the monitoring antenna 113.

The monitoring unit 101 can estimate the arriving direction of the wireless signal using a phase difference of signals received by a plurality of antennas 113, a method of estimating a phase difference and an amplitude difference, or the like. The arriving direction of the wireless signal includes at least one of a position at which the wireless signal is originated and a propagation path from a position at which the wireless signal is originated to the antenna 113.

The radio wave state is not limited to the above examples but may include additional information such as, for example, a wireless standard of a received wireless signal and detailed information conforming to a standard (for example, a communication rate). The additional information can be acquired, for example, by analyzing a header of a frame obtained on the basis of the wireless signal.

The monitoring unit 101 monitors at least one of the above radio wave states and stores a monitoring result in, for example, the storage 122.

The output control unit 102 outputs output information based on the monitoring result by the monitoring unit 101. For example, the output control unit 102 transmits the monitoring result to the wireless communication system 50 as the output information without change. The output control unit 102 may designate at least one of the devices included in the wireless communication system 50 as a destination and transmit the output information. For example, the output control unit 102 may transmit the output information to at least one of the access point 51 and the information processing device that sets the access point 51 as a destination. The output control unit 102 may transmit the output information by, for example, a broadcast command without designating a destination.

The output control unit 102 may transmit the output information using any communication path. For example, the output control unit 102 may transmit the output information using at least one of wireless communication (first wireless communication) conforming to a standard used by the wireless communication system 50, wireless communication (second wireless communication) conforming to a standard different from that of the first wireless communication, and wired communication via a connection line connected to a device serving as a destination.

If the wireless communication conforming to the standards used by the wireless communication system 50 is used, it is possible to minimize a change and modification when the present embodiment is applied to the wireless communication system 50.

The power supply control unit 103 controls wireless power supply by the electromagnetic wave to the power receiving device 60. For example, the power supply control unit 103 controls the wireless power supply by a microwave that is an electromagnetic wave of a frequency of 300 MHz to 3 THz. The power supply control unit 103 may perform the wireless power supply based on a timing and/or a frequency according to the monitoring result. For example, the power supply control unit 103 may determine a timing at which the wireless communication by the wireless communication system 50 is not performed with reference to the monitoring result and perform control such that the wireless power supply is executed at this timing. Accordingly, it is possible to prevent interference to the wireless communication system 50 by the wireless power supply.

For example, each of the above respective units (the monitoring unit 101, the output control unit 102, and the power supply control unit 103 is implemented by one or more processors. For example, each of the above respective units may be implemented by causing a processor such as a central processing unit (CPU) to execute a program, that is, software. The above respective units may be implemented by a processor such as a dedicated integrated circuit (IC), that is, hardware. The above respective units may be implemented using software and hardware in combination. In a case in which a plurality of processors are used, each processor may implement one or more of the respective units or implement two or more of the respective units.

Next, a monitoring process by the power supply device 100 having the above configuration according to the first embodiment will be described. The monitoring process is a process of monitoring the radio wave state by the power supply device 100 and outputting (providing) a monitoring result to the wireless communication system 50 or the like.

The monitoring process may be executed in parallel with a power supply process to the power receiving device 60 or may be executed at a timing at which the power supply process is not being performed. In other words, the receiving unit 111 and the transmitting unit 112 may be controlled such that they operate during different period of times by tinting control or may be controlled such that they operate simultaneously or asynchronously using a device for reducing mutual signal leakage. Such control can be also applied to each of the following embodiments.

Figure 2:
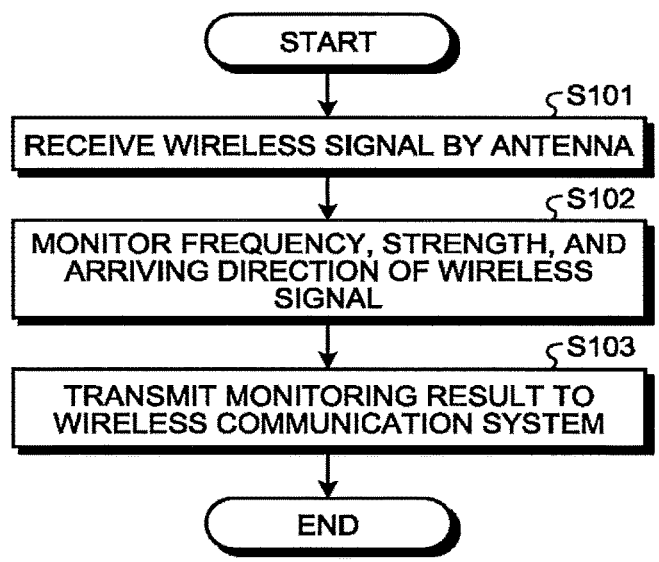
FIG. 2 is a flowchart of a monitoring process in the first embodiment.

FIG. 2 is a flowchart illustrating an example of the monitoring process in the first embodiment.

The receiving unit 111 receives the wireless signal by the antenna 113, and outputs the wireless signal that has undergone a process such as demodulation to the monitoring unit 101 (Step S101).

The monitoring unit 101 monitors a frequency, a strength, and an arriving direction of the received wireless signal (Step S102). For example, the monitoring unit 101 stores a monitoring result having a format in which a change in a frequency and a strength of a reception signal is understood in the storage 122. In a case in which the arriving direction of the wireless signal can be estimated, the monitoring unit 101 may estimate the arriving direction and store an estimation result in the storage 122.

Figure 3:
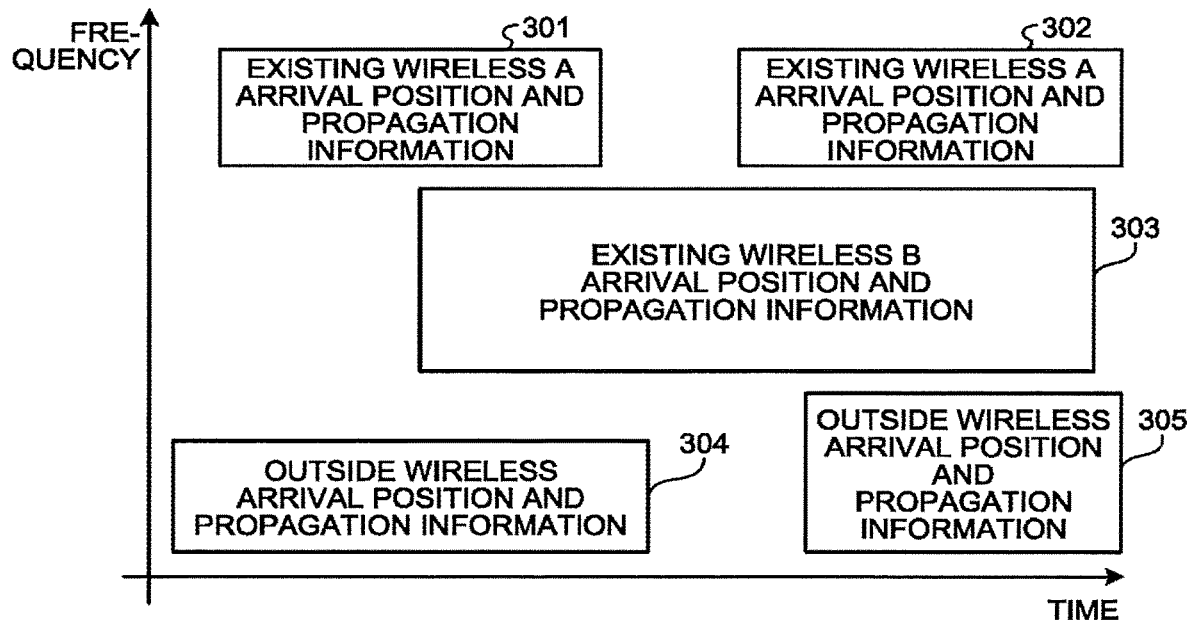
FIG. 3 is a diagram for describing an example of a monitoring result.

FIG. 3 is an illustration of an example of the monitoring result. FIG. 3 illustrates an example of monitoring results 301 to 305 when a horizontal axis indicates a time, and a vertical axis indicates a frequency. As illustrated in FIG. 3, the monitoring result may include information (propagation information) indicating an arrival position and a propagation path of the wireless signal. The monitoring results 301 and 302 indicate monitoring results corresponding to a frequency used by the existing wireless communication system (for example, the wireless communication system 50). The monitoring result 303 indicates a monitoring result corresponding to a frequency used by a wireless communication system different from the wireless communication system corresponding to the monitoring results 301 and 302. The monitoring results 304 and 305 indicate monitoring results corresponding to frequencies used by systems outside the communication system such as, for example, a weather radar.

Returning to FIG. 2, for example, the output control unit 102 transmits the monitoring result to the wireless communication system 50 via the communication unit 121 (Step S103). The output control unit 102 may transmit the monitoring result at any timing. For example, the output control unit 102 may transmit the monitoring result each time the monitoring result is obtained (in real time) or may transmit the monitoring result with a fixed period.

The wireless communication system 50 can optimize a wireless frequency to be used, a time slot, and a transmission direction of a wireless signal with reference to the transmitted monitoring result.

As described above, in the communication system according to the first embodiment, a high-accuracy monitoring result of the radio wave state can be provided to the wireless communication system 50 using a plurality of antennas 113. The monitoring result is not only used for preventing the interference to the wireless communication system 50 in the power supply device 100 (for example, for controlling a power transmission timing and a frequency of the transmitting unit 112) but also provided to the wireless communication system 50. Thus, the monitoring result can be used for improving and optimizing the communication state (a data throughput or the like) in the wireless communication system 50.

Second Embodiment

In a second embodiment, information indicating an optimal frequency channel estimated on the basis of the radio wave state is provided as the monitoring result.

Figure 4:
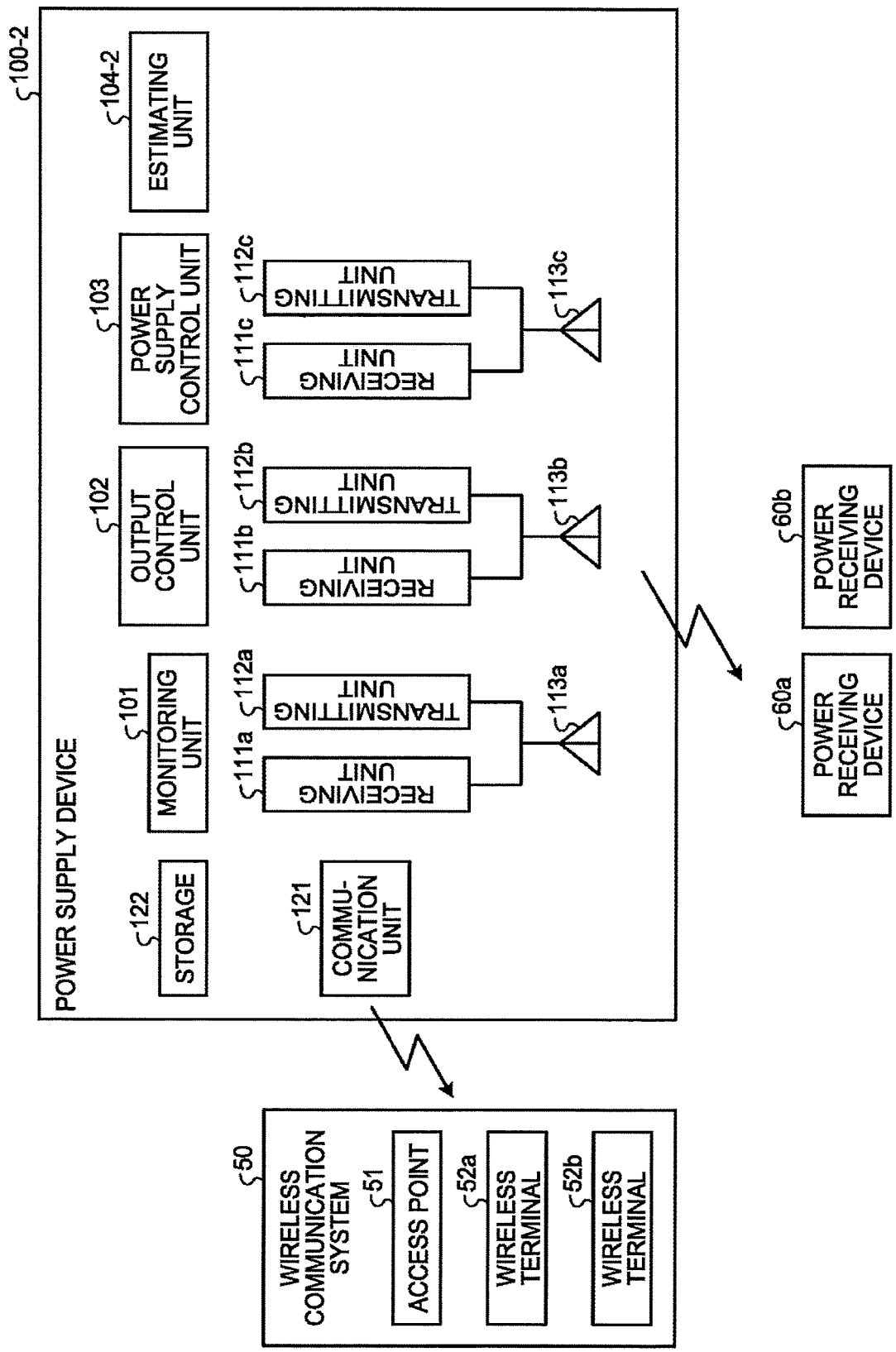
FIG. 4 is a block diagram of a communication system according to a second embodiment.

FIG. 4 is a block diagram illustrating an example of a configuration of a communication system including a power supply device 100-2 according to the second embodiment. As illustrated in FIG. 4, the power supply device 100-2 includes a communication unit 121, storage 122, receiving units 111*a* to 111*c*, transmitting units 112*a* to 112*c*, antennas 113*a* to 113*c*, a monitoring unit 101, an output control unit 102, a power supply control unit 103, and an estimating unit 104-2.

The second embodiment differs from the first embodiment in that the estimating unit 104-2 is added. Since the other configurations and functions are similar to those in FIG. 1 that is a block diagram of the power supply device 100 according to the first embodiment, the same reference numerals are assigned, and description thereof is omitted here.

The estimating unit 104-2 estimates the frequency used by the wireless communication system 50 on the basis of the monitoring result by the monitoring unit 101. For example, the estimating unit 104-2 estimates a frequency channel that is not being used with reference to the monitoring result.

In the present embodiment, the output control unit 102 outputs information indicating the frequency estimated by the estimating unit 104-2 as the output information based on the monitoring result. The information indicating the frequency may be a value of the frequency, may be information indicating a range of the frequency, or information (such as a channel number) identifying the frequency channel corresponding to the estimated frequency.

Figure 5:
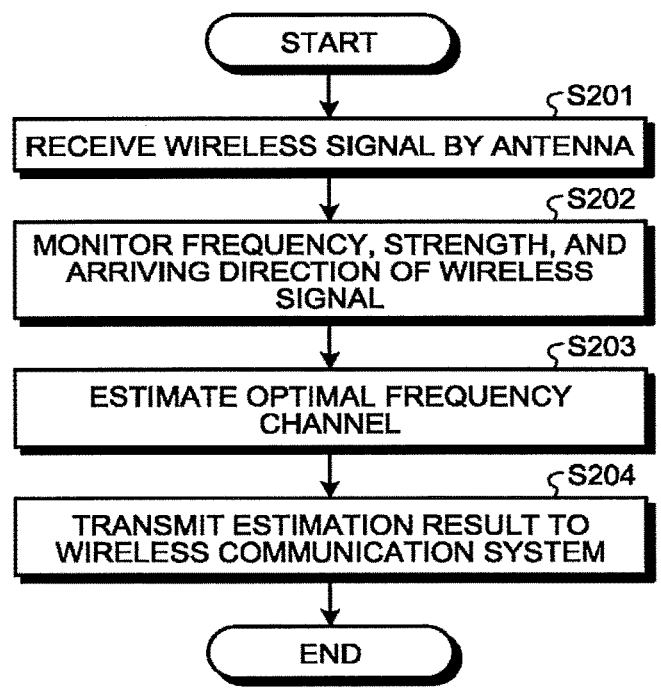
FIG. 5 is a flowchart of a monitoring process in the second embodiment.

Next, a monitoring process by the power supply device 100-2 having the above configuration according to the second embodiment will be described with reference to FIG. 5. FIG. 5 is a flowchart illustrating an example of the monitoring process in the second embodiment.

Since Steps S201 to S202 are processes similar to Steps S101 to S102 in the power supply device 100 according to the first embodiment, description thereof is omitted.

The estimating unit 104-2 estimates an optimal frequency (frequency channel) used by the wireless communication system 50 with reference to the monitoring result by the monitoring unit 101 (Step S203). The output control unit 102 transmits information indicating the estimated frequency to the wireless communication system 50 as the output information (Step S204).

Figure 6:
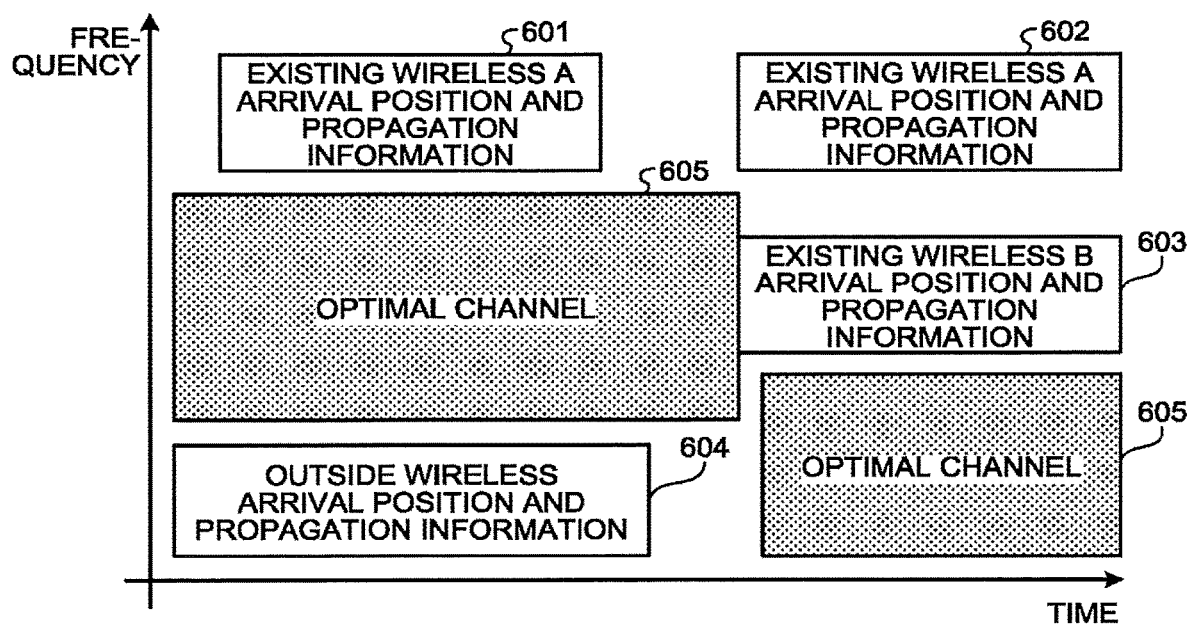
FIG. 6 is a diagram illustrating an example of an estimation result by an estimating unit.

FIG. 6 is a diagram illustrating an example of the estimation result by the estimating unit 104-2. In the example of FIG. 6, the optimal frequency channel (optimal channels 605 and 606) is estimated from four monitoring results 601 to 604. As illustrated in FIG. 6, for example, the estimating unit 104-2 estimates a frequency channel corresponding to a range of a frequency that is not used at each time as the optimal channel. Since the radio wave state changes with the passage of time, the optimal channel is also updated with this change.

As described above, in the second embodiment, instead of a detailed monitoring result, the information indicating the frequency channel estimated in the power supply device 100-2 on the basis of the monitoring result is output to the wireless communication system 50. On the wireless communication system 50 side, it is not necessary to perform the process of estimating the optimal frequency channel on the basis of the monitoring result. Accordingly, it is possible to reduce a computational complexity, power consumption, and a cost of the wireless communication system 50 and reduce a traffic volume for transmitting the monitoring result. Further, it can be easily introduced to the existing wireless communication system 50.

Third Embodiment

In a third embodiment, an abnormality of the wireless communication system 50 is determined on the basis of the radio wave state, and a determination result is output (provided in notification).

Figure 7:
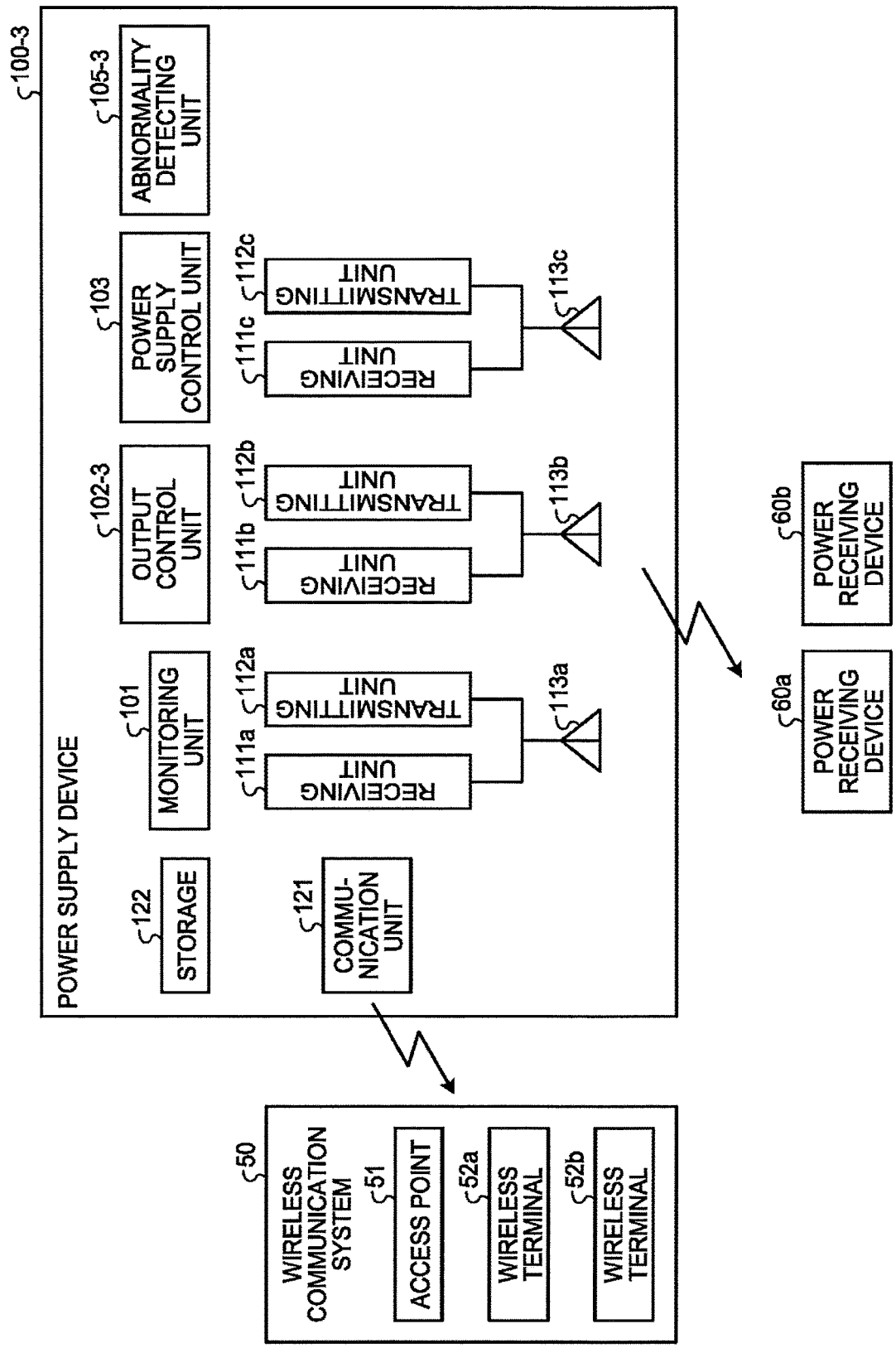
FIG. 7 is a block diagram of a communication system according to a third embodiment.

FIG. 7 is a block diagram illustrating an example of a configuration of a communication system including a power supply device 100-3 according to the third embodiment. As illustrated in FIG. 7, the power supply device 100-3 includes a communication unit 121, storage 122, receiving units 111a to 111c, transmitting units 112a to 112c, antennas 113a to 113c, a monitoring unit 101, an output control unit 102-3, a power supply control unit 103, and an abnormality detecting unit 105-3.

The third embodiment differs from the first embodiment in that a function of the output control unit 102-3 is different, and the abnormality detecting unit 105-3 is added. Since the other configurations and functions are similar to those in FIG. 1 that is a block diagram of the power supply device 100 according to the first embodiment, the same reference numerals are assigned, and description thereof is omitted here.

The abnormality detecting unit 105-3 detects an abnormality of communication by the wireless communication system 50 on the basis of the monitoring result by the monitoring unit 101. For example, the abnormality detecting unit 105-3 determines that an abnormality occurs when a variation amount of a frequency exceeds a threshold value, when a variation amount of a strength of a wireless signal exceeds a threshold value, when there is an inconsistency between information indicated by a header and a wireless signal, or the like.

The output control unit 102-3 differs from the output control unit 102 of the embodiment in that it further outputs output information indicating an abnormality detected by the abnormality detecting unit 105-3. An output destination may be devices (the access point 51, the wireless terminal 52, and the like) included in the wireless communication system 50 or may be a device other than these devices.

For example, when an abnormality is detected, the output control unit 102-3 transmits the output information indicating the abnormality to the wireless communication system 50 via the communication unit 121. The output control unit 102-3 may transmit the output information indicating the abnormality to a specific output destination such as a manager of the wireless communication system 50. The output control unit 102-3 may output an alert sound to an audio output device such as a speaker or light to a light output device such as an alert light as the output information indicating the abnormality.

Figure 8:
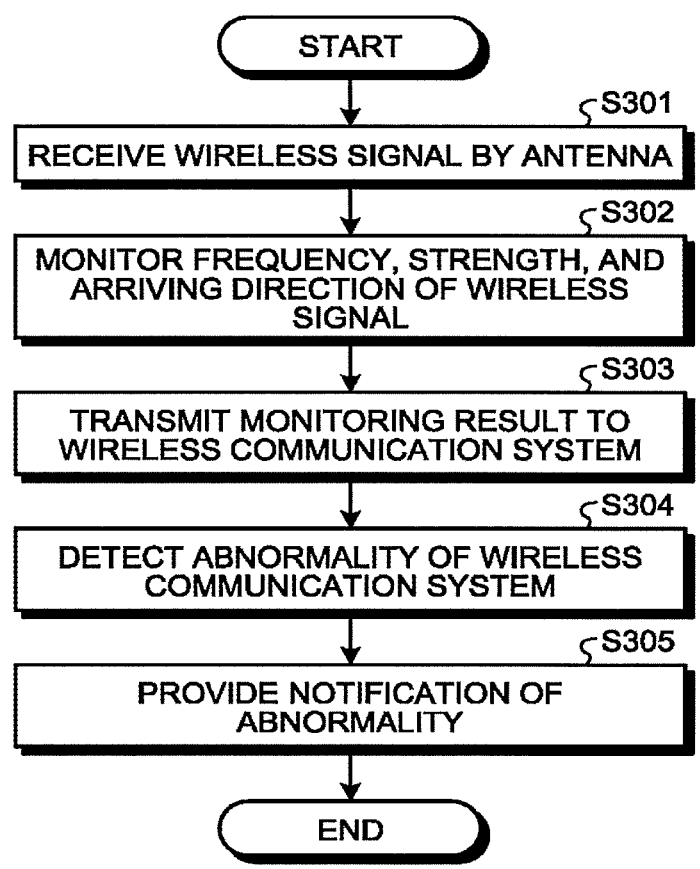
FIG. 8 is a flowchart of a monitoring process in the third embodiment.

Next, a monitoring process by the power supply device 100-3 having the above configuration according to the third embodiment will be described with reference to FIG. 8. FIG. 8 is a flowchart illustrating an example of the monitoring process in the third embodiment.

Since Steps S301 to S303 are processes similar to Steps S101 to S103 of the power supply device 100 according to the first embodiment, description thereof is omitted.

The abnormality detecting unit 105-3 detects whether or not an abnormality of communication by the wireless communication system 50 occurs with reference to the monitoring result by the monitoring unit 101 (Step S304). The output control unit 102-3 outputs (provides notification of) the output information indicating the detected abnormality to at least one of the wireless communication system 50 and the output destinations other than the wireless communication system 50 when an abnormality is detected (Step S305).

As described above, in the third embodiment, the abnormal state of the wireless communication system 50 is detected and provided in notification by the power supply device 100-3, and thus it is possible to deal with the abnormality promptly.

Fourth Embodiment

In a fourth embodiment, a mobile object such as a human is detected, and a detection result is output (provided in notification).

Figure 9:
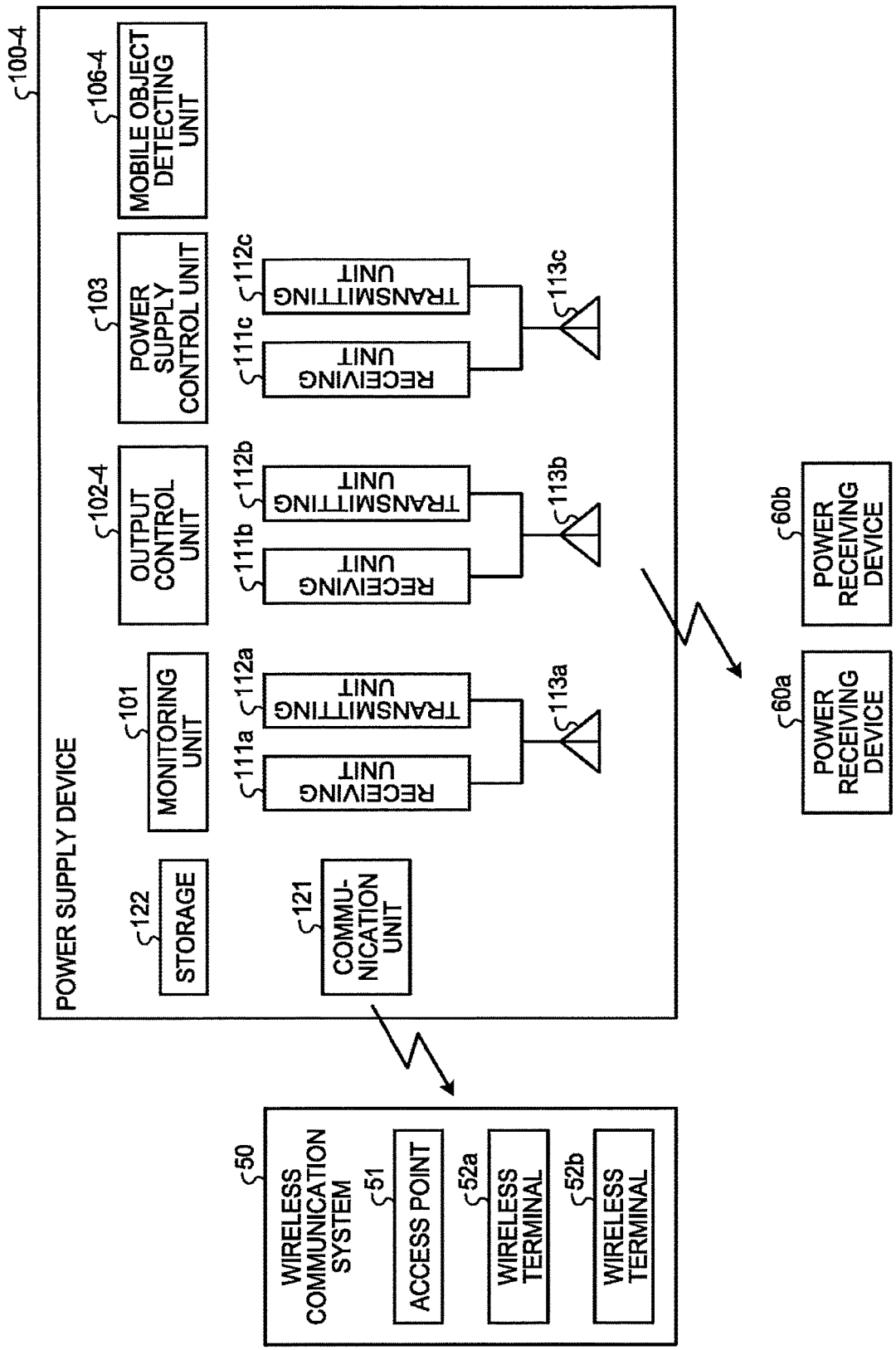
FIG. 9 is a block diagram of a communication system according to a fourth embodiment.

FIG. 9 is a block diagram illustrating an example of a configuration of a communication system including a power supply device 100-4 in accordance with the fourth embodiment.

As illustrated in FIG. 9, the power supply device 100-4 includes a communication unit 121, storage 122, receiving units 111a to 111c, transmitting units 112a to 112c, antennas 113a to 113c, a monitoring unit 101, an output control unit 102-4, a power supply control unit 103, and a mobile object detecting unit 106-4.

The fourth embodiment differs from the first embodiment in that a function of the output control unit 102-4 is different, and the mobile object detecting unit 106-4 is added. Since the other configurations and functions are similar to those in FIG. 1 that is a block diagram of the power supply device 100 according to the first embodiment, the same reference numerals are assigned, and description thereof is omitted here.

The mobile object detecting unit 106-4 detects a mobile object. For example, the mobile object detecting unit 106-4 detects a mobile object using an array antenna as a multiple input multiple output (MIMO) sensor. A method of detecting the mobile object is not limited to this example, and any method can be used. For example, the mobile object detecting unit 106-4 may use a method of detecting a mobile object by analyzing an image obtained by an imaging device (camera), a method of detecting a mobile object using an infrared sensor, or the like.

The output control unit 102-4 differs from the output control unit 102 of the embodiment in that it further outputs information related to a detected mobile object. Examples of the information related to the mobile object include information indicating that there is a mobile object, information identifying a position of a mobile object (such as information indicating a position, information indicating a direction, or the like).

The power supply control unit 103 may be configured to control the power supply in accordance with a detection result for the mobile object. For example, the power supply control unit 103 controls a timing, a direction, or the like such that a human body serving as a detected mobile object is not irradiated with an electromagnetic wave for power supply. Accordingly, it is possible to suppress the electromagnetic waves from having influence on the human body.

Figure 10:
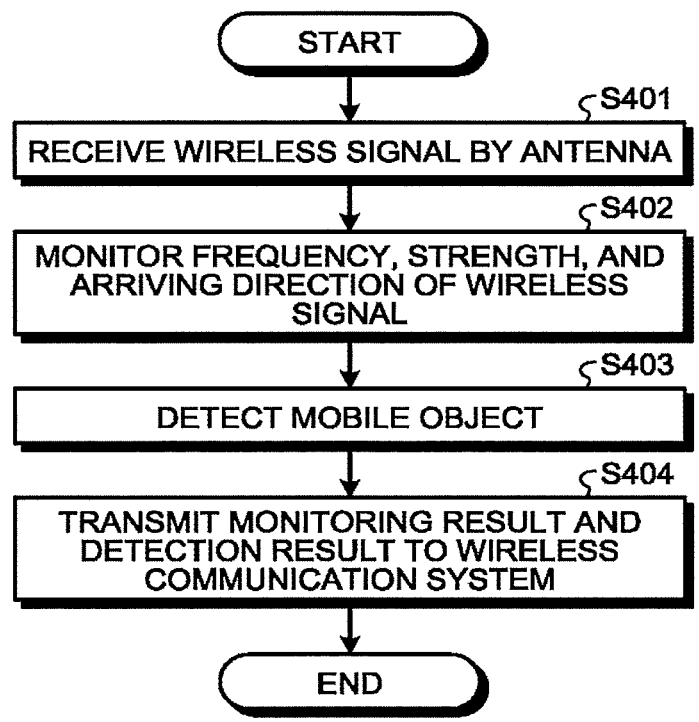
FIG. 10 is a flowchart of a monitoring process in the fourth embodiment.

Next, a monitoring process by the power supply device 100-4 having the above configuration according to the fourth embodiment will be described with reference to FIG. 10. FIG. 10 is a flowchart illustrating an example of the monitoring process in the fourth embodiment.

Since Steps S401 to S402 are processes similar to Steps S101 to S102 of the power supply device 100 according to the first embodiment, description thereof is omitted.

The mobile object detecting unit 106-4 performs a processing of detecting the mobile object (Step S403). When the mobile object is detected, the output control unit 102-4 transmits a detection result for the mobile object to the wireless communication system 50 in addition to the monitoring result (Step S404).

On the basis of the detection result, the wireless communication system 50 can execute, for example, control of not performing wireless communication when there is a mobile object, control for changing wireless communication settings such that influence on the mobile object is reduced, control for changing the wireless communication settings such that influence of the mobile object on wireless communication is reduced, and control for restoring changed settings to original settings when there is no longer mobile object, or the like.

FIG. 10 illustrates an example of detecting the mobile object after the radio wave state is monitored, but a detection timing is not limited to this example. For example, the detection of the mobile object and the monitoring of the radio wave state may be executed independently. The output control unit 102-4 may execute output of the monitoring result and output of the detection result of the mobile object independently.

Thus, in the fourth embodiment, it is possible to detect the mobile object such as the human body, thereby protecting the human body at the time of power supply. Further, the wireless communication system 50 can improve and optimize the communication state more efficiently using the provided detection result.

First Modified Example

Figure 11:
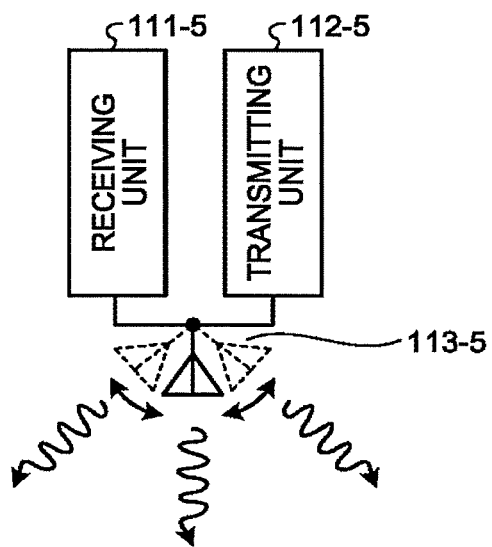
FIG. 11 is a diagram illustrating an example of an antenna according to a first modified example.

Instead of using the array antenna as in each of the above embodiments, a mobile antenna may be used. FIG. 11 is a diagram illustrating a configuration example of a receiving unit 111-5, a transmitting unit 112-5, and an antenna 113-5 according to a first modified example. The receiving unit 111-5, the transmitting unit 112-5, and the antenna 113-5 illustrated in FIG. 11 can be used instead of the receiving unit, the transmitting unit, and the antenna in each of the embodiments described above.

The antenna 113-5 is configured to be able to change an antenna directivity, for example, by mechanically changing a direction, a shape, or an antenna to be used (such as an area to be used among areas of the antenna 113-5). A method of changing the antenna directivity is not limited to this example, and any method can be used. For example, the antenna directivity may be changed by switching an element value connected to the antenna 113-5 or an antenna to be used electronically.

The receiving unit 111-5 and the transmitting unit 112-5 are connected to the antenna 113-5 having the above configuration and perform a reception process and a transmission process, respectively.

Using reception results of the antenna 113-5 and the receiving unit 111-5, the monitoring unit 101 can estimate the arriving direction or the propagation path of the received wireless signal. Similarly, even when the transmitting unit 112-5 transmits the power supply signal, it is possible to avoid or reduce the interference to the wireless communication system 50 by switching the antenna directivity.

In FIG. 11, the receiving unit 111-5, the transmitting unit 112-5, and the antenna 113-5 are constituted by one system, but a plurality of systems may be installed as such a system. In a single system, the number of receiving units 111-5, the number of transmitting units 112-5, and the number of antennas 113-5 need not be one, and the number of receiving units 111-5, the number of transmitting units 112-5, and the number of antennas 113-5 may be an arbitrary number.

Second Modified Example

Figure 12:
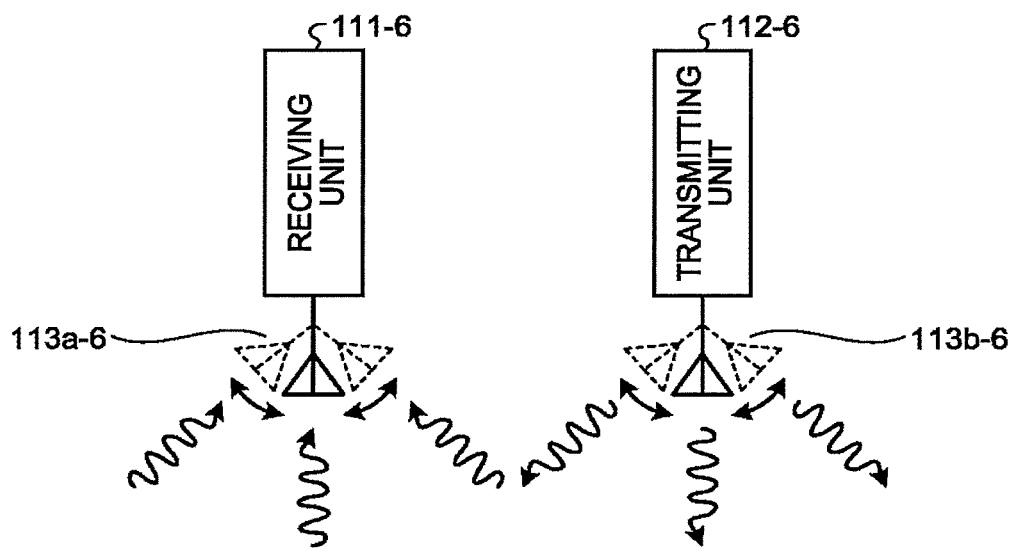
FIG. 12 is a diagram illustrating an example of an antenna according to a second modified example.

The mobile antennas in the first modified example may be configured to be divided into ones for reception and ones for transmission. FIG. 12 illustrates a configuration example of a receiving unit 111-6, a transmitting unit 112-6, and antennas 113a-6 and 113b-6 according to a second modified example configured as described above. The receiving unit 111-6, the transmitting unit 112-6, and the antennas 113a-6 and 113b-6 illustrated in FIG. 12 can be used instead of the receiving unit, the transmitting unit, and the antenna in each of the embodiments described above.

The antennas 113a-6 and 113b-6 are antennas that can change the antenna directivity mechanically or electronically as in the antenna 113-5 of the first modified example. The antenna 113a-6 is connected to the receiving unit 111-6 and used in the reception process. The antenna 113b-6 is connected to the transmitting unit 112-6 and used in the transmission process.

As described above, according to the first to fourth embodiments, the quality of the wireless communication system can be improved since the radio wave state monitored by the power supply device is output to, for example, the wireless communication system.

A program executed by the power supply devices according to the first to fourth embodiments is provided in a form in which it is embedded in a Read Only Memory (ROM) or the like in advance.

The program executed by the power supply devices according to the first to fourth embodiments may be configured to be provided as a computer program product in a form in which it is recorded in a computer readable recording medium such as a compact disk read only memory (CD-ROM), a flexible disk (FD), a compact disk recordable (CD-R), or a digital versatile disk (DVD) in a file having an installable format or an executable format.

Further, the program executed by the power supply devices according to the first to fourth embodiments may be stored in a computer connected to a network such as the Internet and provided by downloading via a network. The program executed by the power supply devices according to the first to fourth embodiments may be configured to be provided or distributed via a network such as the Internet.

The program executed by the power supply devices according to the first to fourth embodiments may cause a computer to function as the respective units of the power supply device described above. The computer can read a program from a computer readable storage medium onto a main storage device and execute the program using a CPU.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
   a receiver to receive, via an antenna, a wireless signal that is sent by at least one communication device different from a power receiving device and a power supply device, the power receiving device being supplied power by an electromagnetic wave, the power supply device transmitting the electromagnetic wave;
   one or more processors configured to:
      monitor a radio wave state of the wireless signal; and
      output output information based on a monitoring result, wherein
   a frequency of the wireless signal interferes with a frequency of the electromagnetic wave.

2. The electronic apparatus according to claim 1,
   wherein the one or more processors output the output information to the at least one communication device.

3. The electronic apparatus according to claim 2, wherein, the one or more processors estimate a frequency that is usable by the wireless communication system on the basis of the monitoring result, and
   transmit information indicating the frequency to the communication device.

4. The electronic apparatus according to claim 2, wherein, the one or more processors detect an abnormality of communication by the wireless communication system on the basis of the monitoring result, and
   transmit information indicating that the abnormality is detected to at least one of the communication device and a device different from the communication device.

5. The electronic apparatus according to claim 2,
   wherein the one or more processors transmit the output information using at least one of first wireless communication used by the wireless communication system, second wireless communication different from the first wireless communication, and wired communication with the communication device.

6. The electronic apparatus according to claim 1,
   wherein the output information includes at least one of a temporal change of a frequency of the wireless signal, a temporal change of a strength of the wireless signal, and an arriving direction of the wireless signal.

7. The electronic apparatus according to claim 6,
   wherein the one or more processors estimate the arriving direction; and
   the arriving direction includes at least one of a first position at which the wireless signal is originated and a propagation path from the first position.

8. The electronic apparatus according to claim 1, wherein, the one or more processors detect a mobile object, and output information related to the detected mobile object.

9. The electronic apparatus according to claim 1, further comprising:
   a transmitter to transmit, via the antenna, an electromagnetic wave used for wireless power supply to the power receiving device.

10. The electronic apparatus according to claim 9,
    wherein the one or more processors control at least one of:
    a frequency of the electromagnetic wave used for wireless power supply,
    a timing at which the electromagnetic wave used for wireless power supply is transmitted, and an antenna directivity of the antenna, on the basis of the radio wave state.

11. The electronic apparatus according to claim 9,
    wherein the receiver further receives, via the antenna, the electromagnetic wave transmitted by the transmitter as a second wireless signal; and
    the radio wave state includes a radio wave state of the second wireless signal.

12. The electronic apparatus according to claim 1,
    wherein the receiver further receives, via the antenna, the electromagnetic wave transmitted by the electromagnetic wave as a third wireless signal; and
    the radio wave state includes a radio wave state of the third wireless signal.

13. The electronic apparatus according to claim 1,
    wherein the one or more processors monitor the radio wave state on the basis of an additional information of the wireless signal.

14. The electronic apparatus according to claim 1,
    A wherein the frequency of the wireless signal is a frequency of a band of ±10% of the frequency of the electromagnetic wave.

15. The electronic apparatus according to claim 1,
    wherein the one or more processors control wireless power supply by the electromagnetic wave to the power receiving device.

16. A monitoring method, comprising:
    receiving, via an antenna, a wireless signal that is sent by at least one communication device different from a power receiving device and a power supply device, the power receiving device being supplied power by an electromagnetic wave, the power supply device transmitting the electromagnetic wave;
    monitoring a radio wave state of the wireless signal; and
    outputting output information based on a monitoring result, wherein
    a frequency of the wireless signal interferes with a frequency of the electromagnetic wave.

17. A computer program product having a non-transitory computer readable medium including programmed instructions, wherein the instructions, when executed by a computer, cause the computer to perform:
    receiving, via an antenna, a wireless signal that is sent by at least one communication device different from a power receiving device and a power supply device, the power receiving device being supplied power by an electromagnetic wave, the power supply device transmitting the electromagnetic wave;
    monitoring a radio wave state of the wireless signal; and
    outputting output information based on a monitoring result, wherein
    a frequency of the wireless signal interferes with a frequency of the electromagnetic wave.

18. A communication system, comprising:
    an electronic apparatus; and
    a wireless communication system that performs wireless communication,
    the electronic apparatus including
    a receiver to receive, via an antenna, a wireless signal that is sent by at least one communication device different from a power receiving device and a power supply device, the power receiving device being supplied power by an electromagnetic wave, the power supply device transmitting the electromagnetic wave;
    one or more processors configured to:
    monitor a radio wave state of the wireless signal, and
    output output information based on a monitoring result, wherein
    a frequency of the wireless signal interferes with a frequency of the electromagnetic wave.

* * * * *